E. J. McCLANAHAN.
INCUBATOR.
APPLICATION FILED SEPT. 20, 1909.
998,790.
Patented July 25, 1911.
2 SHEETS—SHEET 1.
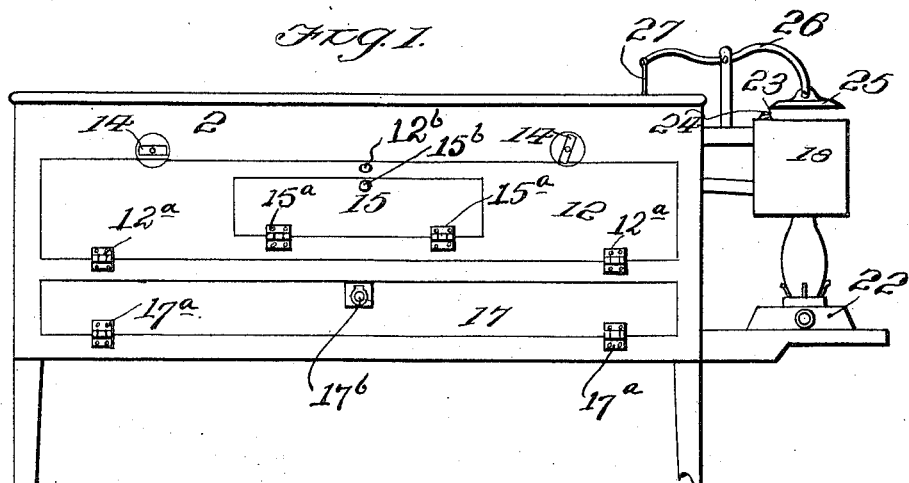
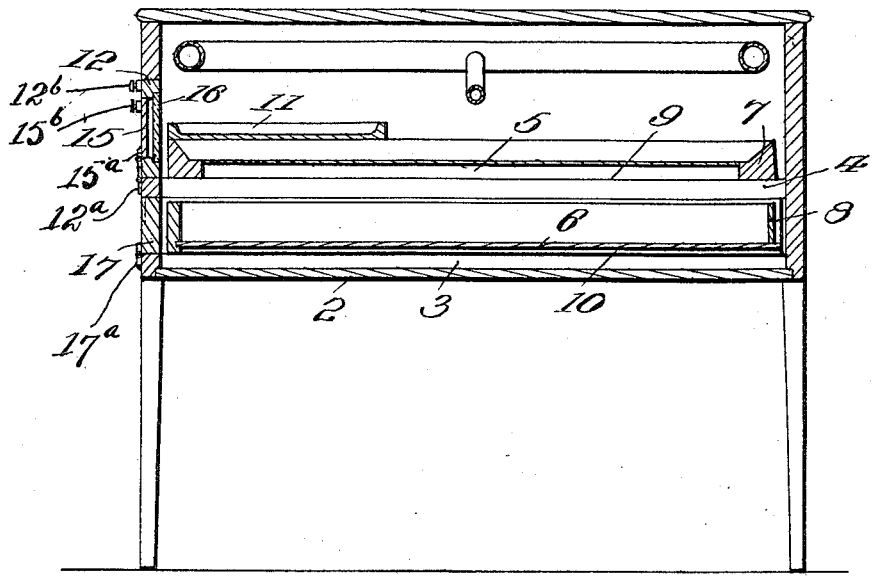

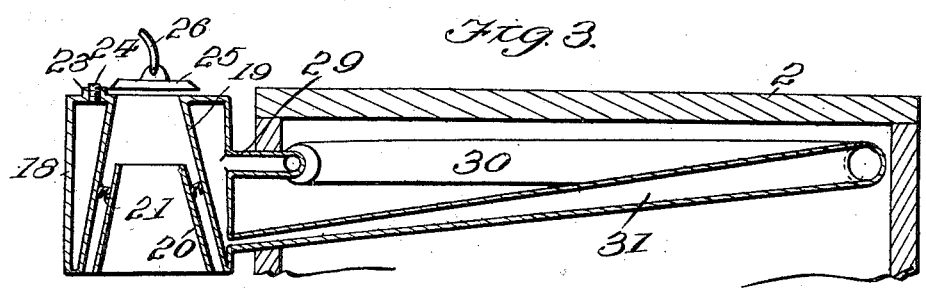
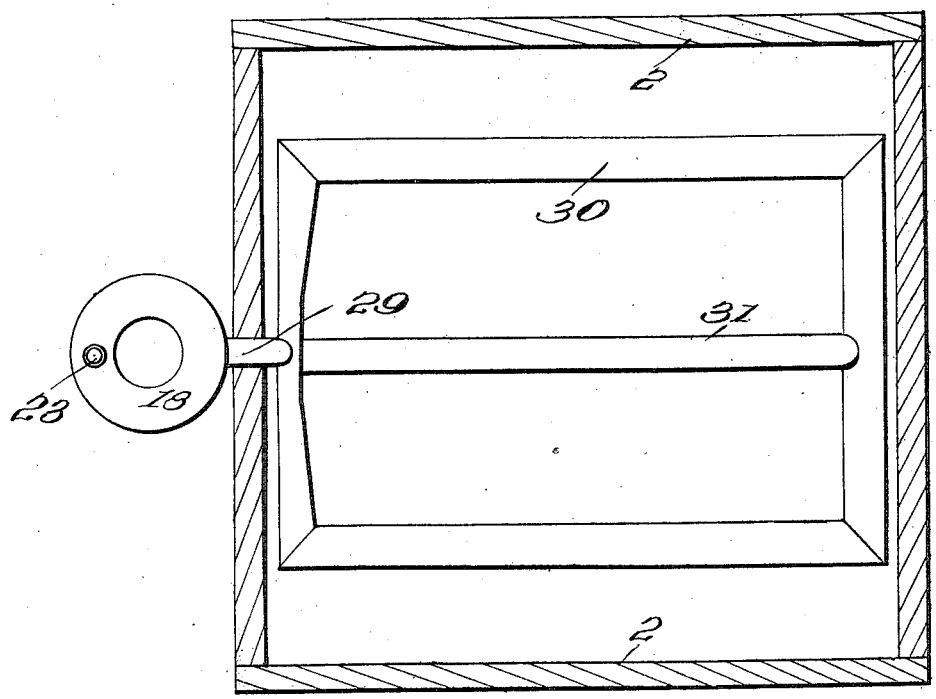

UNITED STATES PATENT OFFICE.

EDWARD J. McCLANAHAN, OF EUGENE, OREGON.

INCUBATOR.

998,790.   Specification of Letters Patent.   Patented July 25, 1911.

Application filed September 20, 1909. Serial No. 518,514.

*To all whom it may concern:*

Be it known that I, EDWARD J. MCCLANAHAN, a citizen of the United States, residing at Eugene, in the county of Lane and State of Oregon, have invented certain new and useful Improvements in Incubators, of which the following is a specification.

My invention relates to incubators and brooders, and the object of the invention is to provide an incubator and brooder in which the incubator is provided with a plurality of trays for holding eggs and small chickens, and the front of the incubator casing is formed with a plurality of doors, one for each of the trays, permitting the removal of the entire tray corresponding to that door, without disturbing the remainder of the trays, while one of the main doors in the front of the incubator is provided with an auxiliary door so located as to permit the inspection and removal of eggs which are nearly hatched or which are likely to be hatched at any minute.

Further objects of my invention deal with the provision of a heating means for an incubator casing, as before described, of a very simple and convenient character.

For a full understanding of the invention and the merits thereof, and to acquire a knowledge of the details of construction, reference is to be had to the following description and accompanying drawing, in which:

Figure 1 is a front view of the incubator casing; Fig. 2 is a section thereof, in a plane at right angles to the front of the casing; Fig. 3 is a detail vertical section of the heater for the casing, and the circulation pipes; and, Fig. 4 is a plan view of said heater and the circulation pipes, the casing being shown in section.

Corresponding and like parts are referred to in the following description and indicated in all the views of the drawing by the same reference characters.

Referring to these drawings, 2 designates an incubator casing, rectangular in plan and entirely inclosed. This casing is made of wood or any other suitable material and is supported in any desired manner. The side walls of the casing, on the inner faces, are provided with the opposed oppositely disposed longitudinal rails 3 and 4, upon which the egg trays and chicken trays are to be supported, the rails 3 being located at the bottom of the incubator and against the side walls thereof so that the upper faces of the rails 3 are above the bottom of the incubator, the rails 4 being so disposed that the upper faces of the rails aline with the lower edge of a door 12 which is provided for the removal of the uppermost tray.

The egg tray is designated by the numeral 5 and is preferably the uppermost tray, while resting upon the strip 3 is the tray 6 for containing chicks only lately out of their shells. The trays 5 and 6 each consists of a rectangular marginal frame designated respectively as 7 and 8, and bottom plates 9 and 10, the bottom plate 9 which supports the eggs which are being incubated, being of relatively thin material. Supported above the egg tray 5 and preferably upon the egg tray, is the tray 11 which I term a nursery tray. Upon this last named tray are placed the eggs which are nearly hatched.

It will be seen that the lowermost tray 6 is supported above the floor of the incubator and that inasmuch as this tray is less in length than the depth of the incubator, a space is left around the tray and beneath the door thereof for the circulation of heated air. The tray 5 is, of course, supported on the strips 4 and hence there is ample room for the circulation of air above and beneath the tray 5. It is, of course, necessary that the air shall circulate beneath the bottoms of the trays as well as over the top of the trays.

The upper portion of the front of the casing is closed by a door 12 which, as seen in Fig. 1, has a length equal to the width of the tray 5, so that the tray 5 may be inserted or withdrawn through the opening for the door 12. The door is hinged at its upper edge by hinges 12ª and is held closed by buttons 14. Formed in the center of the door 12 is the auxiliary door 15 which is hinged at its lower edge to the door 12 by hinges 15ª and closes into an opening cut out of this door. The inner side of this opening is preferably closed by a pane of glass 16, seen in Fig. 2. The door 15 is held closed in any desired manner. Upon opening the door 15, the contents of the tray 11 may be readily observed through the glass 16, and it may thus be seen whether any of the eggs placed upon the tray 11 are hatching, and this without allowing the escape of the warm air in the upper portion of the incubator, or any change in temperature therein. The doors 12, 15 and 17 are provided with handles 12ᵇ, 15ᵇ and 17ᵇ whereby the doors may be manipulated.

The lower portion of the incubator has hinged upon it the door 17 which has a length equal to the width of the tray 6, and is for the purpose of inserting or removing said tray. The door 17 like the door 12 is hinged at its lower edge by hinges 17ᵃ. The hinging of the doors at their lower edges is important as it permits the doors to be opened slightly and the contents of the egg trays to be observed without the necessity of opening the doors full width and without shutting off the light which would occur were the doors hinged at their upper edges and even when the doors were opened to their full extent. It will be seen that by hinging the doors at their lower edges, the doors may be opened slightly and the observer looking in through the relatively small opening thus formed, will look down upon the egg trays and that light will be directed down upon the eggs in the trays. The egg trays are both so located that the bottoms of the trays are below the lower edges of the doors and the egg tray 5 is so disposed that the tray 11 supported thereon is considerably below the upper edge of the door 12. Thus not only can the trays 5 and 6 be observed, but the tray 11 can be placed under observation without the necessity of opening the doors to their full extent and thus allowing the escape of the warm air. It will be seen that this construction of the incubator front is such as to permit the trays 5, 6 and 11 to be handled independently of each other, and also provides for a removal of either of the trays 5 or 6, or of the tray 11, with a minimum disturbance of the temperature in the incubator. The auxiliary door also permits the contents of the tray 11 to be observed at any time, without changing the temperature of the incubator or allowing an escape of air. As this observation has to be quite frequent when the eggs in the nursery tray are at the point of hatching, the convenience and necessity of the auxiliary door 15 and the glass 16 will be noted.

As a means of heating the incubator, I provide a heater 18 which may have any form, but as shown, is cylindrical. Formed in the central portion of the heater and extending from the bottom thereof to the top, and opening at the bottom and top, is the cone-shaped passage 19, and mounted within this passage, but spaced therefrom, is the cone-shaped radiator 20 which is of course made of sheet metal and supported from the wall of the passage 19 by straps 21. Supported on a bracket beneath the lower end of the radiator, is the lamp 22, whereby the contents of the heater is heated. The upper end of the heating chamber 18 is provided with the filling opening 23, closed by a plug 24. A movable cap 25 is also mounted above the upper end of the passage 19 so as to be moved toward the mouth of the passage or away therefrom to increase or decrease the draft, or to increase or decrease the rapidity with which the heat from the lamp will pass through the radiator and be distributed to the open air. Preferably, this cap 25 is located upon an operating lever 26 which is adjustable by a rod 27. Extending into the incubator casing 2, from the upper end of the heating casing 18, is the discharge pipe 29 which merges into a circulating pipe 30. This circulating pipe is rectangular, as seen in Fig. 4, and is relatively enlarged in diameter. The pipe 3 extends entirely around the incubator casing, inwardly of the walls thereof and supported from the top of the casing in any suitable manner. A return pipe 31 extends downward from the extremity of the circulating pipe 30 and passes out through the wall of the incubator below the pipe 29, and extends into the lower end of the heating chamber 18. There is thus provided a means whereby a fluid such as water may be readily heated to the required degree of temperature, circulated around the interior of the incubator, and then returned to the heating chamber to be reheated.

Having thus described the invention, what I claim is:—

1. In an incubator, an outer casing, the front of the casing being formed with an upper and a lower transversely extending door opening, doors each hinged at its lower edge and each fitting in its respective opening so as to permit the doors to be opened slightly for observation, latches engaging with the upper edges of the doors to hold them closed, the upper doors being formed with a transversely extending opening, a glass pane permanently closing said opening, a door hinged in said opening and closing the same, superposed trays slidingly mounted in the casing in alinement with the doors, said trays being removable therethrough, and a removable tray carried upon the forward end of the uppermost tray less in depth than said tray and disposed in alinement with the opening in the uppermost door so as to be observed therethrough.

2. In an incubator, an outer casing, the front of the casing being provided with upper and lower transversely extending door openings, doors each hinged at its lower edge and fitting in said openings so as to permit the doors to be opened slightly for observation, latches holding the doors closed, the uppermost door being provided with a longitudinally extending opening, a glass panel permanently closing said opening, a door hinged at its lower edge and adapted to close said opening, longitudinally extending pairs of supporting rails disposed within the casing, one pair of rails being carried on the floor of the casing, but below the lowest door opening, the main pair being located on a level with the lower edge of the upper door opening, a removable tray carried upon the lower pair of rails and supported thereby above the bottom of the floor and in alinement with the lowermost door, an upper tray carried upon the upper pair of rails in alinement with the uppermost door, and a nursery tray less in depth than the uppermost tray, but supported thereon in alinement with the inspection opening in the uppermost door.

In testimony whereof I affix my signature in presence of two witnesses.

EDWARD J. McCLANAHAN. [L. S.]

Witnesses:
S. S. SPENCER,
A. F. ROBINSON.

Copies of this patent may be obtained for five cents each, by addressing the "Commissioner of Patents, Washington, D. C."